United States Patent
Nishiyama

(10) Patent No.: US 11,360,713 B2
(45) Date of Patent: Jun. 14, 2022

(54) SEMICONDUCTOR DEVICE AND DEBUG SYSTEM

(71) Applicant: Rohm Co., Ltd., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 144 days.

(21) Appl. No.: 16/798,724

(22) Filed: Feb. 24, 2020

(65) Prior Publication Data

US 2020/0272366 A1  Aug. 27, 2020

(30) Foreign Application Priority Data

Feb. 27, 2019 (JP) .............................. JP2019034675

(51) Int. Cl.
*G06F 3/06* (2006.01)

(52) U.S. Cl.
CPC ............ *G06F 3/0673* (2013.01); *G06F 3/061* (2013.01); *G06F 3/0653* (2013.01); *G06F 3/0655* (2013.01)

(58) Field of Classification Search
CPC .... G06F 11/3656; G06F 3/061; G06F 3/0653; G06F 3/0655; G06F 3/0673
See application file for complete search history.

(56) References Cited

U.S. PATENT DOCUMENTS

| 6,145,123 | A * | 11/2000 | Torrey | ................ | G06F 9/30101 |
| | | | | | 703/28 |
| 2004/0190363 | A1* | 9/2004 | Shigenami | ........... | G11C 7/1051 |
| | | | | | 365/230.03 |
| 2004/0215857 | A1* | 10/2004 | Takeuchi | ............. | G06F 13/364 |
| | | | | | 710/113 |
| 2010/0131718 | A1* | 5/2010 | Uchiyama | ........... | G06F 12/0815 |
| | | | | | 711/144 |
| 2013/0326539 | A1* | 12/2013 | Otani | .................. | G06F 11/2007 |
| | | | | | 719/313 |

FOREIGN PATENT DOCUMENTS

| JP | 1996161191 | 6/1996 |
| JP | 3775462 | 3/2006 |

* cited by examiner

*Primary Examiner* — Zhuo H Li
(74) *Attorney, Agent, or Firm* — Fish & Richardson P.C.

(57) ABSTRACT

The present invention monitors read data or write data of a CPU without generating any influences on an execution operation of a program.

An LSI includes: a processing unit, executing a program; a storage unit, capable of performing a read operation or a write operation; and an internal bus, connected to the processing unit and the storage unit; and a monitoring unit (21). The processing unit is capable of performing a read access or a write access, the read access is outputting a read enable signal (RE) and an address signal (ADD) to the internal bus, and the write access is outputting write data (WD), a write enable signal (WE) and the address signal to the internal bus. The storage unit outputs the read data to the internal bus in response to the read access and stores the write data in response to the write access. The monitoring unit latches the read data or the write data to be sent through the internal bus when an access meeting a set monitoring condition is present.

11 Claims, 10 Drawing Sheets

Read access, Read operation

Write access, Write operation

SEMICONDUCTOR DEVICE AND DEBUG SYSTEM

BACKGROUND OF THE INVENTION

Field of the Invention

The present invention relates to a semiconductor device and a debug system.

Description of the Prior Art

In a semiconductor device having a central processing unit (CPU) executing programs, a debug system is used in most cases during the development of the programs executed. A debug system supports a debug operation of a program by using storage data displaying a storage circuit in the semiconductor device, or by providing and performing a function of a specific operation on the program for a development target.

FIG. 11 shows a structural diagram of a debug system. The debug system in FIG. 11 includes a semiconductor device 910 serving as a large scale integration (LSI) having a built-in CPU, and an external device 930. The semiconductor device 910 includes a CPU 911, an internal bus 912, a read-only memory (ROM) 913, a random access memory (RAM) 914, a peripheral apparatus 915 having a built-in register 916, and a debug circuit 917. A program executed by the CPU 911 is a debug target. The CPU 911 reads values (programs or data) from the ROM 913, the RAM 914 or the register 916 through the internal bus 912 on the basis of a program executed thereby, or performs an operation based on read values, and writes an operation result to the RAM 914 or the register 916.

The external device 930 includes a host computer executing debug software, or an interface device between a host computer and the semiconductor device 910. The external device 930 is capable of accessing the ROM 913, the RAM 914 or the register 916 by having the debug circuit 917 access the internal bus 912.

PRIOR ART DOCUMENTS

Patent publication

[Patent document 1] Japan Publication of Patent Application No. 3775462
[Patent document 2] Japan Patent Publication No. 8-161191

SUMMARY OF THE INVENTION

Problems to be Solved by the Invention

A debug operation executed by the CPU 911 has requirements of monitoring and tracking in real time about what value the CPU 911 reads from a register or what value is written to the register. On the other hand, a debugging circuit equipped in the semiconductor device 910 is not related to original actions of the semiconductor device 910. Thus, minimal scale of such circuit is desired and the actions of the program need to be unaffected.

As described above, the external device 930 may access the ROM 913, the RAM 914 or the register 916 by accessing the internal bus 912. However, in the access, the CPU 911 is incapable of knowing a read value (read data) or a written value (write data) accurately. That is because of the first and second reasons below.

For the first reason, values stored in the RAM 914 or the register 916 may also be updated by built-in hardware (a peripheral apparatus block or a direct memory access (DMA) controller, referred as an internal highway (HW) hereinafter) in the semiconductor device 910, other than the CPU 911.

For the second reason, during a read access and a write access, the RAM 914 or the register 916 performing different operations may be used.

A specific example that the CPU 911 is incapable of knowing the read value or the written value accurately is described below. In order to provide specific description, it is considered that a storage circuit as a monitored target is a register, and the register is referred to as a target register.

Refer to FIG. 12. FIG. 12 depicts a condition where values (stored data) of the target register are sequentially updated by an internal HW. The CPU 911 reads the values of the target register by performing a read access according to timing of a program executed thereby. Further, at timing $t_{A1}$, $t_{A2}$ and $t_{A3}$, the CPU 911 reads "1", "3" and "4" serving as the values of the target register. To perform program debug, it needs to know that the CPU 911 reads the values "1", "3" and "4" sequentially from the target register (or the above is being needed in some cases). The external device 930 may know the values of the target register at constant intervals by periodical read accesses. However, the information acquired by such method is only a sequential change in time of the values of the target register, but it is unknown whether CPU 911 reads the values "1", "3" and "4" from the target register sequentially. In other words, it is not clear which value has been read from the target register by CPU 911, and thus debug cannot be performed or difficult to be performed.

Refer to FIG. 13. In the example of FIG. 13, it is assumed that the target register is an 8-bit register, and a prefix "0x" in a hexadecimal notation is used to record the value (stored data) of the target register. The target register includes bit $B_0$ to bit $B_7$, and among the bit $B_0$ to bit $B_7$, $B_0$ is the least significant bit and $B_7$ is the most significant bit. The bit $B_j$ stores the value representing a request or a state of an interrupt process due to a factor $X_j$ (where j is an integer more than 0 and less than 7). When the internal HW requests the CPU 911 to execute an interrupt process due to the factor $X_j$, "1" is set in the bit $B_j$ of the target register. When "1" is set in the bit $B_j$ of the target register, the CPU 911 identifies performing of the interrupt process due to the factor $X_j$ is being requested, executes the requested interrupt process, and resets the bit $B_j$ of the target register once the execution is complete. Resetting the bit $B_j$ indicates setting the value of the bit $B_j$ to "0".

In the condition shown in FIG. 13, before a timing $t_{B1}$, the value of the target register is "0x00". At the timing $t_{B1}$, the bit $B_0$ of the target register is set to "1" by the internal HW, and the interrupt process due to the factor $X_0$ is requested to be performed. In a subsequent timing $t_{B2}$, "1" is set in the bit $B_1$ of the target register by the internal HW, and the interrupt process due to the factor $X_1$ is requested to be performed. At a subsequent timing $t_{B3}$, the CPU 911 reads the value "0x03" from the target register by a read access. In the example shown in FIG. 13, according to the read value "0x03", the CPU 911 first performs the interrupt process due to the factor $X_0$, and then resets the bit $B_0$ of the target register at a timing $t_{B4}$ once the interrupt process is performed. According to the specifications of the target register, if only the bit $B_0$ among the bits $B_0$ to $B_7$ is reset, the CPU 911 writes "0x01" (writing by a binary notation sets a bit to be reset to "1", that is, "00000001b"). Then, the CPU 911 performs the interrupt process due to the factor $X_1$, and resets the bit $B_1$ of the target register at a timing $t_{B5}$ once the interrupt process due to the factor $X_1$ is performed. According to the specifications of the target register, if only the bit $B_1$ among the bits $B_0$ to $B_7$ is reset, the CPU 911 writes "0x02" (writing by a binary notation sets a bit to be reset to "1", that is, "00000010b").

To perform program debug, it needs to know that the CPU 911 reads the values "0x03" from the target register, and then writes "0x01" and "0x02" to the target register sequentially (or the above is being needed in some cases). The external device 930 may know the values of the target register at constant intervals by periodical read accesses. However, the information acquired by such method is only a sequential change in time of the values of the target register. For example, by the periodical read accesses, the external device 930 may identify that the value of the target register at the timing $t_{B3}$ changes from "0x03" to "0x02". However, the external device 930 cannot differentiate whether the change is caused by writing of the CPU 9111 or caused by writing of the internal HW (withdrawn by a request for the interrupt process due to the internal HW). In other words, the actions of the CPU cannot be known, and thus debug cannot be performed or difficult to be performed.

In the condition that the semiconductor device 910 includes a plurality of CPUs 911, it becomes even more complicated. Assuming that the semiconductor device 910 includes a first CPU and a second CPU serving as the plurality of CPUs, a specific example in FIG. 14 is described.

FIG. 14 depicts a condition wherein values (stored data) of a target resister are sequentially updated by an internal HW. The first CPU and the second CPU perform read accesses according to timing of programs executed respectively to read the values of the target register. Herein, at timing $t_{A1}$, $t_{A2}$ and $t_{A3}$, the first CPU sequentially reads "1", "3" and "4" as the values of the target register. Independently with respect to the above, at timing $t_{C1}$, $t_{C2}$ and $t_{C3}$, the second CPU sequentially reads "2", "3" and "4" as the values of the target register. In order to perform program debug, the first CPU having sequentially read the values "1", "3" and "4" from the target register, and the second CPU having sequentially read the values "2", "3" and "4" need to be known (alternatively, the above is needed in some cases). The external device 930 may know the values of the target register at constant intervals by periodical read accesses. However, the information acquired by such method is only a sequential change in time of the values of the target register, but it is unknown whether the first CPU reads the values "1". "3" and "4" from the target register sequentially, and whether the second CPU reads the values "2", "3" and "4" from the target register sequentially. In other words, it is not clear which value has been read from the target register by each of the CPUs, and thus debug cannot be performed or difficult to be performed.

As described above, it is not easy to monitor values (read data) read by or values (write data) written by a processing unit (e.g., a CPU) executing programs. Therefore, there is a need to develop the technology realizing above requirement.

Further, there are tracking memories configured in advance in a semiconductor device to track data read or written by a processing unit, or technologies for reading values of a tracking memory from an external device. However, the scale of a circuit of the tracking memory is correspondingly large, and is thus a main factor causing a significant increase in cost of a semiconductor device (e.g., an LSI). Moreover, the value of the tracking memory may only be read after temporarily terminating hardware (i.e., ceasing program operations), such that the program cannot be executed while a debug operation is being performed in real time.

The purpose of the present invention is to provide a semiconductor device and a debug system that are capable of monitoring read or write data acquired by read or write accesses with simple structure and the execution of a program is unaffected.

[Technical Means for Solving the Problem]

A semiconductor device of the present invention is configured as below (a first configuration), i.e., including: a processing unit, executing a program; a storage unit, having a plurality of storage areas allocated with a plurality of addresses, and performing a read operation or a write operation; and a bus, connected to the processing unit and the storage unit. The processing unit performs a read access or a write access according to the program. The read access enables the storage unit to perform the read operation by outputting a read enable signal and an address signal to the bus. The read enable signal permits the read operation and the address signal designates any one of the plurality of addresses. The write access enables the storage unit to perform the write operation by outputting a write data, a write enable signal and the address signal to the bus. The write enable signal permits the write operation. When the read access is performed, the storage unit performs the read operation, that is, outputting a data in the storage area as read data to the bus and the read data being inputted through the bus to the processing unit. The data in the storage area is corresponding to the address signal inputted from the processing unit through the bus. When the write access is performed, the storage unit performs the write operation, that is, storing data corresponding to the write data in the storage area. The storage area is corresponding to the address signal inputted from the processing unit through the bus. The semiconductor device further includes a monitoring unit, latching the read data or write data sent through the bus when access is matching a set monitoring condition in access performed by the processing unit.

The semiconductor device according to the first configuration may also be a configuration below (a second configuration), that is, wherein the monitoring unit includes: a setting unit, setting the monitoring condition; a determination unit, determining whether the access performed by the processing unit is matching the monitoring condition: and a latch unit, latching the read data or the write data if access performed by the processing unit is matching the monitoring condition.

The semiconductor device according to the second configuration may also be a configuration below (a third configuration), that is, in the monitoring condition, an target address and an target access type are set; when the address designated by access performed by the processing unit and the target address are matched and the processing unit performs access suitable for the target access type, the determination unit determines that access performed by the processing unit is matching the monitoring condition.

The semiconductor device according to the third configuration may also be a configuration below (a fourth configuration), that is, if the target access type includes the read access, the read data is latched by the latch unit if the processing unit performs the read operation on the target address.

The semiconductor device according to the third or fourth configuration may also be a configuration below (a fifth configuration), that is, if the target access type includes the write access, the write data is latched by the latch unit if the processing unit performs the write operation on the target address.

A semiconductor device of the present invention may also be a configuration below (a sixth configuration), that is, including: a processing block, having first to $n_{th}$ processing units (where n is an integer more than 2) executing a program respectively; a storage unit, having a plurality of storage areas allocated with a plurality of addresses and performing a read operation or a write operation; and a bus, connected to each of the processing units and the storage unit. Each of the processing units is capable of performing a read access or a write access according to the corresponding program, the read access enables the storage unit to perform the read operation by outputting a read enable signal permitting the read operation and an address signal designating any one of the plurality of addresses to the bus, and the write access enables the storage unit to perform the write operation by outputting write data, a write enable signal permitting the write operation and the address signal to the bus. When the $i_{th}$ processing unit performs the read access, the storage unit performs the read operation, that is, outputting data in the storage area corresponding to the address signal inputted from the $i_{th}$ processing unit through the bus and serving as read data to the bus, and the read data at this point is inputted through the bus to the $i_{th}$ processing unit (where i is an integer more than 1 and less than n). When the $i_{th}$ processing unit performs the write access, the storage unit performs the write operation, that is, storing data corresponding to the write data from the $i_{th}$ processing unit to the storage area corresponding to the address signal inputted from the $i_{th}$ processing unit through the bus. The semiconductor device further includes a monitoring unit, which latches the read data or write data to be sent through the bus when an access matching a set monitoring condition is present in the access performed by the processing block.

The semiconductor device according to the sixth configuration may also be a configuration below (a seventh configuration), that is, wherein the monitoring unit includes: a setting unit, setting the monitoring condition; a determination unit, determining whether the access performed by the processing block matches the monitoring condition; and a latch unit, latching the read data or the write data if the access performed by the processing block matches the monitoring condition.

The semiconductor device according to the seventh configuration may also be a configuration below (an eighth configuration), that is, in the monitoring condition, an target address and an target access type are set with respect to each of the processing units, and data obtained by an access of which processing unit is set as a latch target; if the data obtained by the access of the $i_t$ processing unit is set as the latch target in the monitoring condition, if the address designated by the access performed by the $i_{th}$ processing unit and the target address set with respect to the $i_{th}$ processing unit are consistent, and the $i_{th}$ processing unit performs an access suitable for the target access type set with respect to the $i_{th}$ processing unit, the determination unit determines that the access performed by the processing block matches the monitoring condition.

The semiconductor device according to the eighth configuration may also be a configuration below (a ninth configuration), that is, if the target access type set with respect to the $i_{th}$ processing unit includes the read access, the read data to be inputted to the $i_{th}$ processing unit is latched by the latch unit if the $i_{th}$ processing unit performs the read access on the target address set with respect to the $i_{th}$ processing unit.

The semiconductor device according to the eighth or ninth configuration may also be a configuration below (a tenth configuration), that is, if the target access type set with respect to the $i_{th}$ processing unit includes the write access, the write data to be outputted from the $i_{th}$ processing unit is latched by the latch unit if the $i_{th}$ processing unit performs the write access on the target address set with respect to the $i_{th}$ processing unit.

A debug system of the present invention is configured as below (an eleventh configuration), that is, including: the semiconductor device formed by any configuration of the first to tenth configuration: and an external device, connected to the semiconductor device; wherein, monitoring condition data designating the monitoring condition are sent from the external device to the semiconductor device, and the data latched in the monitoring unit are sent from the semiconductor device to the external device.

Effects of the Invention

According to the present invention, a semiconductor device and a debug system capable of monitoring read or write data acquired by a read or write access are provided by a simple structure without generating influences on execution operations of a program.

DETAILED DESCRIPTION OF THE EMBODIMENTS

Specific examples of embodiments of the present invention are described with reference to the accompanying drawings below. In the reference drawings, the same part is represented by the same denotation, and repeated description of the same part is in principle omitted. Further, in the description, for brevity, information, signals, physical quantities or names of components or portions corresponding to signs or symbols representing information, signals, physical quantities or components or portions of denotation references may be omitted or abbreviated. For example, a monitoring condition setting unit (referring to FIG. 4) referred to by "41" is sometimes recited as a monitoring condition setting unit 41 and is sometimes abbreviated as a setting unit 41, which however refer to the same matter.

First Embodiment

Figure 1:
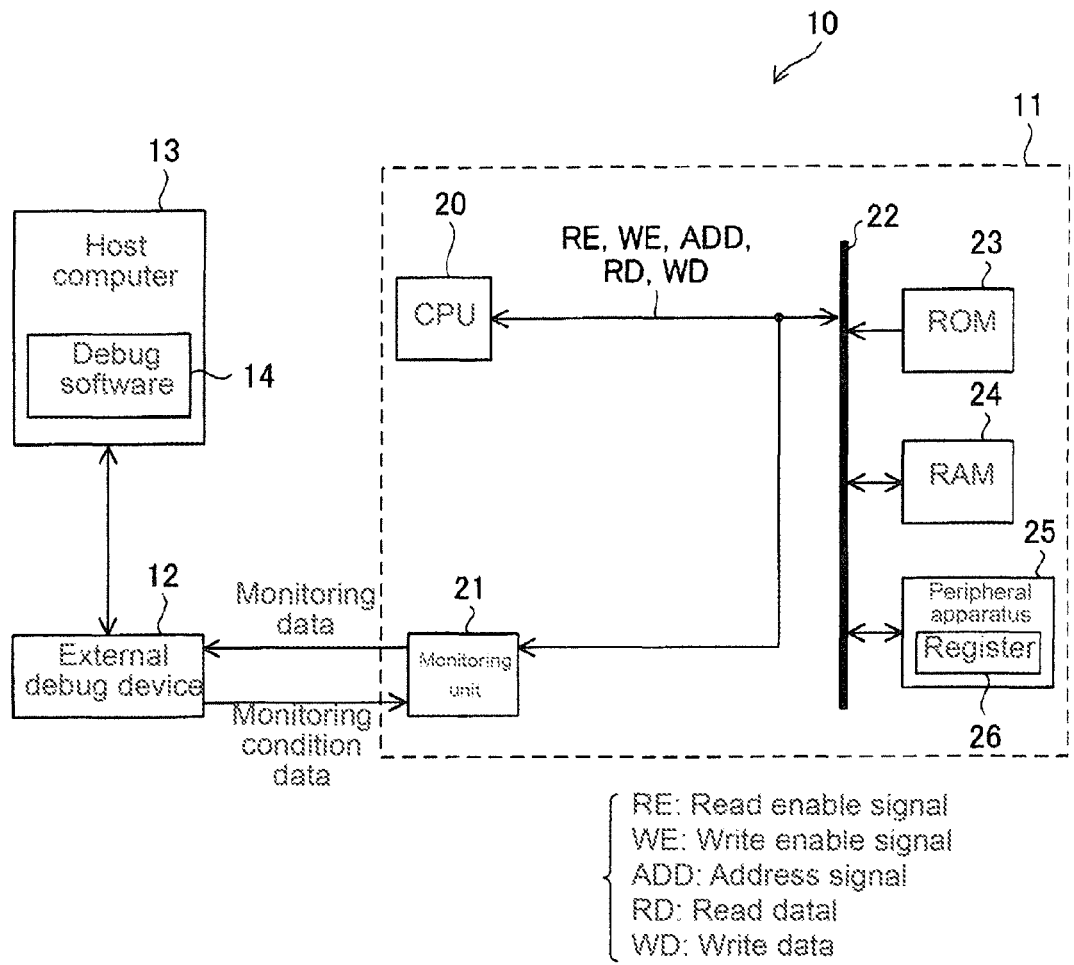
FIG. 1 is a brief structural diagram of a debug system according to a first embodiment of the present invention.

The first embodiment of the present invention is to be described below. FIG. 1 shows a brief structural diagram of a debug system 10 according to the first embodiment of the present invention. The debug system 10 includes a large scale integration (LSI) 11 having a built-in central processing unit (CPU), an external debug device 12, and a host computer 13 (to be referred to as a host PC 13 hereinafter).

The LSI 11 serving as a semiconductor device includes a CPU 20, a monitoring unit 21 and an internal bus 22. The CPU 20 is connected to the internal bus 22. In a form of being capable of receiving signals and data outputted from the CPU 20 to the internal bus 22 as well as signals and data inputted from the internal bus 22 to the CPU 20 by the using the monitoring unit 21, the monitoring unit 21 is connected to a wire between the CPU 20 and the internal bus 22.

The LSI 11 further includes more than one read only memory (ROM), more than one random access memory (RAM), and more than one peripheral apparatus serving as more than one peripheral circuit, as components connected to the internal bus 22. In FIG. 1, a ROM 23 serving as one ROM included in more than one ROM, a RAM 24 serving as one RAM included in more than one RAM, and a peripheral apparatus 25 serving as one peripheral apparatus included in more than one peripheral apparatus are depicted. The following description focuses on the ROM 23, the RAM 24 and the peripheral apparatus 25 serving as ROM. RAM and peripheral apparatus. A register 26 is built in the peripheral apparatus 25.

The CPU 20 executes a program stored in a program memory (not shown) configured in the LSI 111. The program memory may also be built in the CPU 20. The CPU 20 may access the internal bus 22 according to requirements while executing a program to read stored data in the ROM 23, the RAM 24 or the register 26, or write data to the RAM 24 or the register 26.

The external debug device 12 is connected to the monitoring unit 21 by a terminal (not shown) provided in the LSI 111, to serve as an interface that functions accordingly between the monitoring unit 21 and the host PC 13. The external debug device 12 and the host PC 13 are connected in a mode capable of bi-directional communication. Debug software 14 is executed in the host PC 13. A user of the debug system 10 may perform a debug operation of a program executed by the CPU 20 by operating the host PC 13 executing the debug software 14. Monitoring condition data may be sent from the external debug device 12 to the monitoring unit 21, and the monitoring data may be sent from the monitoring unit 21 to the external debug device 12. Details associated with the data above are to be given shortly in the following.

Figure 2:
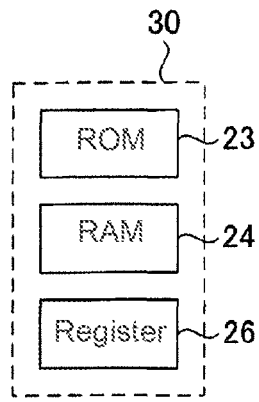
FIG. 2 is a diagram of a storage unit provided in an LSI.

Referring to FIG. 2, to keep the illustration simple, a storage circuit, which is provided in the LSI 11 and includes the ROM 23, the RAM 24 and the register 26, is referred to as a storage unit 30. The storage unit 30 has a plurality of storage areas capable of storing data of predetermined sizes. Predetermined address spaces are defined in the storage unit 30, and inherent addresses are allocated to the storage areas forming the storage unit 30.

The CPU 20 may access the internal bus 22. An access with respect to the internal bus 22 includes a read access and a write access. The read access or write access with respect to the internal bus 22, in other words, may be a read access or a write access of the storage unit 30 through the internal bus 22. An access with respect to the RAM 24 or the register 26 may be any one of a read access and a write access. However, an access with respect to the ROM 23 is limited to be a read access. The storage unit 30 (e.g., the RAM 24) performs a read operation and a write operation, wherein the read operation is sending read data required through the internal bus 22 to the CPU 20 when a read access from the CPU 20 is accepted, and the writing operation is storing data corresponding to write data sent from the CPU 20 through the internal bus 22 when a write access from the CPU 20 is accepted.

The CPU 20 may output a read enable signal RE, a write enable signal WE, an address signal ADD and write data WD to the internal bus 22, and an input of read data RD may be accepted through the internal bus 22. The internal bus 22 includes a plurality of wires for individually sending the signals RE, WE and ADD as well as the data RD and WD between the CPU 20 and the storage unit 30.

Further, the read enable signal RE is configured as a one-bit signal set to a value "1" or "0"; the read enable signal RE in a value "1" serves as a signal for permitting a read operation, and the read enable signal RE in a value "1" serves as a signal for prohibiting a read operation. Further, the write enable signal WE is also configured as a one-bit signal set to a value "1" or "0"; the write enable signal WE in a value "1" serves as a signal for permitting a write operation, and the write enable signal WE in a value "0" serves as a signal for prohibiting a write operation. The address signal ADD is a signal designating the address of any one storage area in the storage unit 30, and has a bit count corresponding to the size of the address space defined in the storage unit 30. The read data RD is a data obtained from reading the storage area from data stored in any one storage area in the storage unit 30. The write data WD is a data that has to be written to any one storage area in the storage unit 30. The respective bit counts of the read data RD and the write data WD may be any bit count (e.g., 8 bits).

Figure 3A:
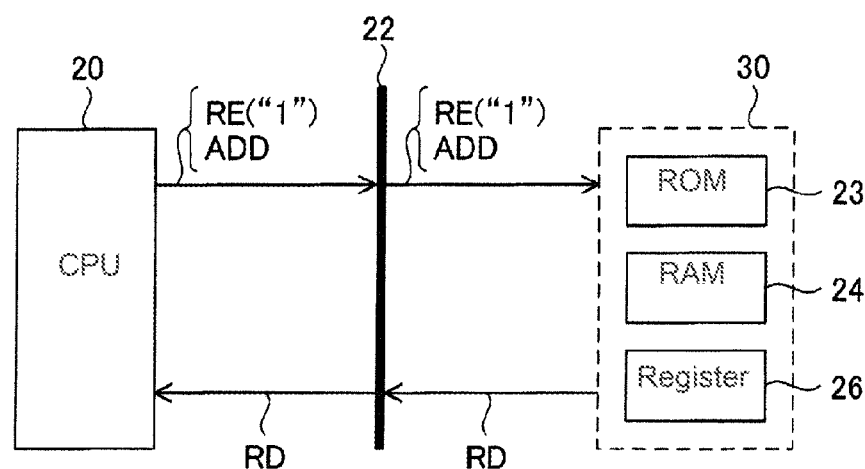
FIG. 3(a) is an illustration diagram of a read access and a read operation.

FIG. 3(a) shows a condition of a read access performed by the CPU 20. The CPU 20 may perform a read access according to a program executed thereby. In the read access, the CPU 20 enables the storage unit 30 to perform a read operation by outputting the read enable signal RE in "1" and the address signal ADD designating any one of the plurality of addresses defined in the storage unit 30 to the internal bus 22. In the read operation in response to the read access, the storage unit 30 (e.g., the RAM 24) reads stored data in a storage area of the address designated by the address signal ADD inputted from the CPU 20 through the internal bus 22, and uses and outputs the read data as the read data RD to the internal bus 22. The read data RD outputted to the internal bus 22 by the read operation is inputted through the internal bus 22 to the CPU 20.

Figure 3B:
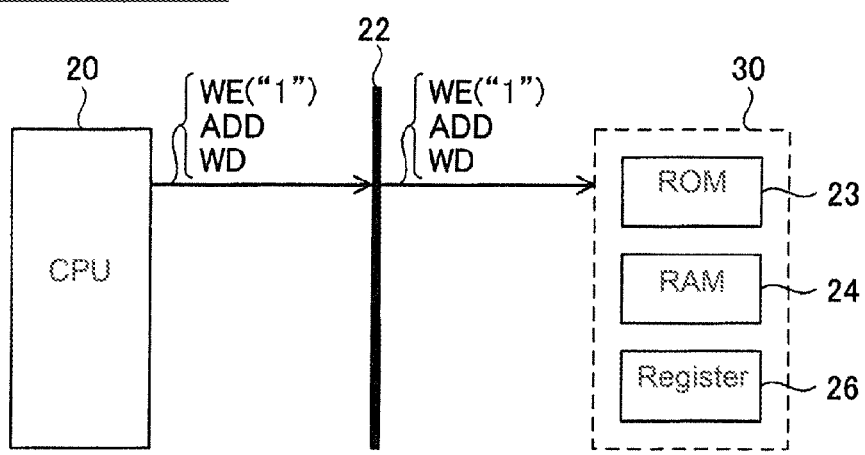
FIG. 3(b) is an illustration diagram of a write access and a write operation according to the first embodiment of the present invention.

FIG. 3(b) shows a condition of a write access performed by the CPU 20. The CPU 20 may perform a write access according to a program executed thereby. In the write access, the CPU 20 enables the storage unit 30 to perform a write operation by outputting the write enable signal WE in "1", the address signal ADD designating any one of the plurality of addresses defined in the storage unit 30, and write data WD to be written to the storage area of the address designated by the address signal ADD to the internal bus 22. In the write operation in response to the write access, the storage unit 30 (e.g., the RAM 24) stores data corresponding to the write data WD from the CPU 20 to the storage area of the address designated by the address signal ADD inputted from the CPU 20 through the internal bus 22. A condition where the stored data and the write data WD of the corresponding storage area after the write operation are consistent may exist. However, a condition where data based on the write data WD according to specifications is inconsistent with the write data WD may also exist.

In the debug operation of the program executed by the CPU 20, a requirement of monitoring and tracking data read from a specific address by the CPU 20 or data written to a specific address by the CPU 20 needs to be satisfied. The monitoring unit 21 may respond to such requirement.

Figure 4:
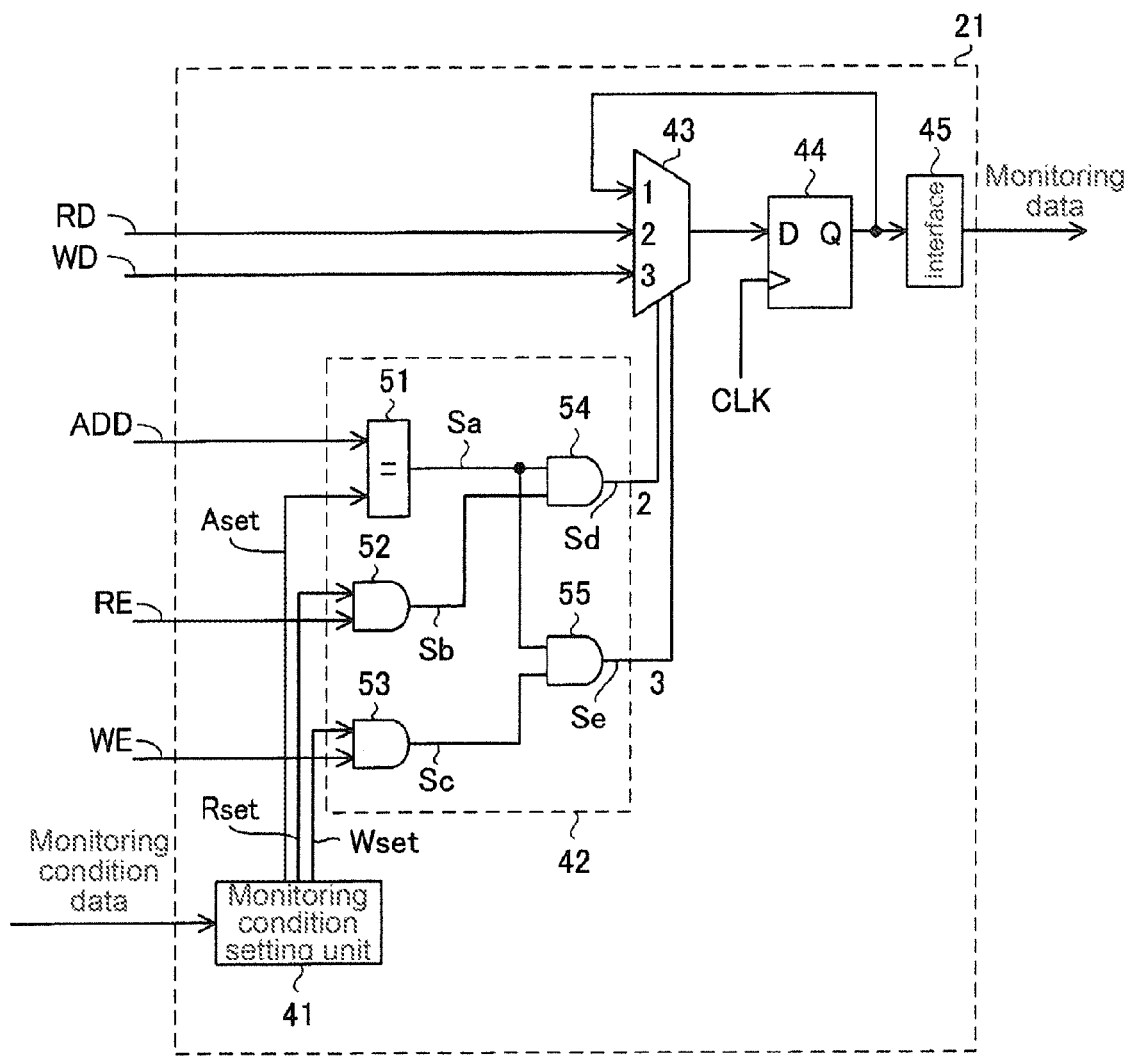
FIG. 4 is an internal structural diagram of a monitoring unit according to the first embodiment of the present invention.

FIG. 4 shows an internal structure of the monitoring unit 21. The monitoring unit 21 in FIG. 4 includes a monitoring condition setting unit 41, a monitoring condition determination unit 42, a selector 43, a latch unit 44 and an interface 45.

A user of the debug system 10 may assign a monitoring condition as desired by operating the host PC 13 before the debug operation of the program of the CPU 20 is performed. In the monitoring condition, an address to be monitored (to be referred to as a target address hereinafter) and the type of access to be monitored (to be referred to as a target access type) are set. The target access type specifies whether an access to be monitored is any one of a read access and a write access, or both of a read access and a write access. The monitoring condition assigned by operating the host PC 13 serves as the monitoring condition data and is provided from the external debug device 12 to the monitoring unit 21.

In the monitoring condition setting unit 41, a monitoring condition including the target address and the target access type are set on the basis of the monitoring condition data provided from the external debug device 12. The monitoring condition setting unit 41 outputs an address setting signal Aset representing the set target address as well as a read setting signal Rset and a write setting signal Wset corresponding to the set target access type to the monitoring condition determination unit 42. The read setting signal Rset and the write setting signal Wset are respectively one-bit signals in a value "1" or "0". The value of the read setting signal Rset becomes "1" if the target access type includes a read access, or else the value of the read setting signal Rset becomes "0" if the target access type does not include a read access. The value of the write setting signal Wset becomes "1" if the target access type includes a write access, or else the value of the write setting signal Wset becomes "0" if the target access type does not include a write access.

For the monitoring condition determination unit 42, the signals ADD, RE and WE outputted from the CPU 20 to the internal bus 22 are inputted, and the signals Aset, Rset and Wset from the setting unit 41 are inputted. The monitoring condition determination unit 42 determines according to the signals ADD, RE and WE as well as the signals Aset, Rset and Wset whether the CPU 20 performs an access matching the monitoring condition.

More specifically, the monitoring condition determination unit 42 includes an address determination circuit 51 and AND gate circuits 52 to 55. The address determination circuit 51 receives the address signal ADD outputted from the CPU 20 to the internal bus 22 and the address setting signal Aset from the setting unit 41, and outputs a signal Sa in a value "1" if the address represented by the address signal ADD and the target address represented by the address setting signal Aset are consistent, or else outputs the signal Sa in a value "0" when these addresses are inconsistent.

The AND gate circuit 52 outputs a signal Sb, which represents the logical AND of the read enable signal RE outputted from the CPU 20 to the internal bus 22 and the read setting signal Rset from the setting unit 41. The signal Sb has a value "1" only if both of the values of the signals RE and Rset are "1", and else has a value "0". The AND gate circuit 53 outputs a signal Sc, which represents the logical AND of the write enable signal WE outputted from the CPU 20 to the internal bus 22 and the write setting signal Wset from the setting unit 41. The signal Sc has a value "1" only if both of the values of the signals WE and Wset are "1", and else has a value "0". The AND gate circuit 54 outputs a signal Sd representing the logical AND of the signals Sa and Sb. The signal Sd has a value "1" only if both of the values of the signals Sa and Sb are "1", and else has a value "0". The AND gate 55 outputs a signal Se representing the logical AND of the signals Sa and Sc. The signal Se has a value "1" only if both of the values of the signals Sa and Sc are "1", and else has a value "0". Because a read access and a write access are not simultaneously performed, the signals Sd and Se do not simultaneously have a value "1".

Thus, if the address designated by the address signal ADD in the access (a read access or a write access) of the CPU 20 and the target address are consistent, and the CPU 20 performs an access suitable for the target access type, the monitoring condition determination unit 42 determines that the access performed by the CPU 20 matches the monitoring condition, and sets the value of the signal Sd or Se to "1". The signal Sd in a value "1" indicates that the access suitable for the target access type is a read access, and the signal Se in a value "1" indicates a write access.

If the CPU 20 performs an access matching the monitoring condition, the selector 43 outputs the read data RD or write data WD to be sent through the internal bus 22 to the latch unit 44. The latch unit 44 has an input terminal D and an output terminal Q. Output data of the selector 43 is inputted to the input terminal D of the latch unit 44. The latch unit 44 latches (i.e., stores) the data that are synchronously applied to the input terminal D with an operation clock CLK of the CPU 20, and outputs the latched data from the output terminal Q. Thus, if the CPU 20 performs an access matching the monitoring condition, the read data RD or the write data WD (in other words, the read data RD or the write data WD obtained by an access matching the monitoring condition) to be sent through the internal bus 22 is latched by the latch unit 44.

More specifically, the selector 43 has first to third terminals and an output terminal. The output data from the output terminal Q of the latch unit 44 is inputted to the first terminal, the second input terminal is connected to the wire for sending the read data RD (the read data RD appears in the wire when the read access is performed), and the third input terminal is connected to the wire for sending the write data WD (the write data WD appears in the wire when the write access is performed). Further, the selector 43 selects and outputs the data to be applied to the first input terminal if the values of the signals Sd and Se are both "0", selects and outputs the data to be applied to the second input terminal if the value of the signal Sd is "1", and selects and outputs the data to be applied to the third input terminal if the value of the signal Se is "1".

Therefore, if the target access type includes a read access, if a read access of the CPU 20 matching the monitoring condition is present (i.e., when the read access is performed with respect to the target address by the CPU 20), the read data RD identical to the read data RD acquired by the CPU 20 through the internal bus 22 is inputted through the selector 43 and then latched in the latch unit 44.

Similarly, if the target access type includes a write access, if a read access of the CPU 20 matching the monitoring condition is present (i.e., when the write access is performed with respect to the target address by the CPU 20), the write data WD identical to the write data WD outputted by the CPU 20 to the internal bus 22 is inputted through the selector 43 and latched in the latch unit 44.

If an access matching the monitoring condition is not performed, the output data of the latch unit 44 is inputted through the first input terminal of the selector 43 to the input terminal D of the latch unit 44, and thus no change occurs in the data latched in the latch unit 44.

The output data of the latch unit 44 is provided to the interface 45. The interface 45 is a circuit that sends the output data of the latch unit 44 as monitoring data to the external debug device 12. The interface 45 and the external debug device 12 operate according to a clock asynchronous with the operation clock CLK of the CPU 20. The debug software 14 may, for example, periodically read the data latched in the latch unit 44 as the monitoring data (controlling the external debug device 12 by such means) so as to fetch the data to be monitored.

As a specific example, an embodiment $CS_R$ is assumed. In the embodiment $CS_R$, it is expected to monitor data read by the CPU 20 from the storage area allocated with an address numbered 5000 in the address space, and a user performs an operation on the host PC 13 according to the expectation. Thus, the target address is set with the numeral 5000, and a read access is set with respect to the target access type. As a result, the address setting signal Aset representing the numeral 5000 and the read setting signal Rset in "1" are outputted from the setting unit 41 to the determination unit 42.

In the embodiment $CS_R$, when the CPU 20 actually performs a read access on the storage area of the address numbered 5000, the address signal ADD representing the address having the numeral 5000 and the read enable signal RD in "1" are outputted from the CPU 20 to the internal bus 22, and hence the monitoring condition with respect to the read access is met, and the value of the signal Sd becomes "1". As a result, the read data RD identical to the read data RD acquired by the CPU 20 through the internal bus 22 is inputted through the selector 43 and latched in the latch unit 44.

For another example, an embodiment $CS_W$ is assumed. In the embodiment $CS_W$, it is expected to monitor data written by the CPU 20 to the storage area allocated with an address numbered 5000 in the address space, and a user performs an operation on the host PC 13 according to the expectation. Thus, the target address is set with the numeral 5000, and a write access is set with respect to the target access type. As a result, the address setting signal Aset representing the numeral 5000 and the write setting signal Wset in "1" are outputted from the setting unit 41 to the determination unit 42.

In the embodiment $CS_W$, when the CPU 20 actually performs a write access on the storage area of the address having the numeral 5000, the address signal ADD representing the address numbered 5000 and the write enable signal WD in "1" are outputted from the CPU 20 to the internal bus 22, and hence the monitoring condition with respect to the write access is met, and the value of the signal Se becomes "1". As a result, the write data WD identical to the write data WD outputted by the CPU 20 to the internal bus 22 is inputted through the selector 43 and latched in the latch unit 44.

In the embodiment $CS_R$ or the embodiment $CS_W$, the target access type may include both of the read access and the write access as desired. However, if the target access type includes both of the read access and the write access, the operations of the embodiment $CS_R$ and the operations of the embodiment $CS_W$ are both implemented by the monitoring unit 21.

According to this embodiment, in the debug operation, the data read from the storage unit 30 or the data written to the storage unit 30 by the CPU 20 may be accurately monitored and tracked. In the implementation, a DMA controller or a tracking memory is not needed (and thus, a circuit additionally provided may be in a small scale), and it is equivalent to monitoring from the side the input/output signals/data of the CPU 20 accompanied by the accesses of the CPU 20 without generating any influences on the behaviors of the CPU 20.

A plurality of monitoring units 21 may also be provided in the LSI 11. Accordingly, read data RD or write data WD with respect to a plurality of addresses may be monitored. Further, in this case, some of the structures (e.g., the interface 45) may be shared among the plurality of monitoring units 21.

Second Embodiment

Figure 5:
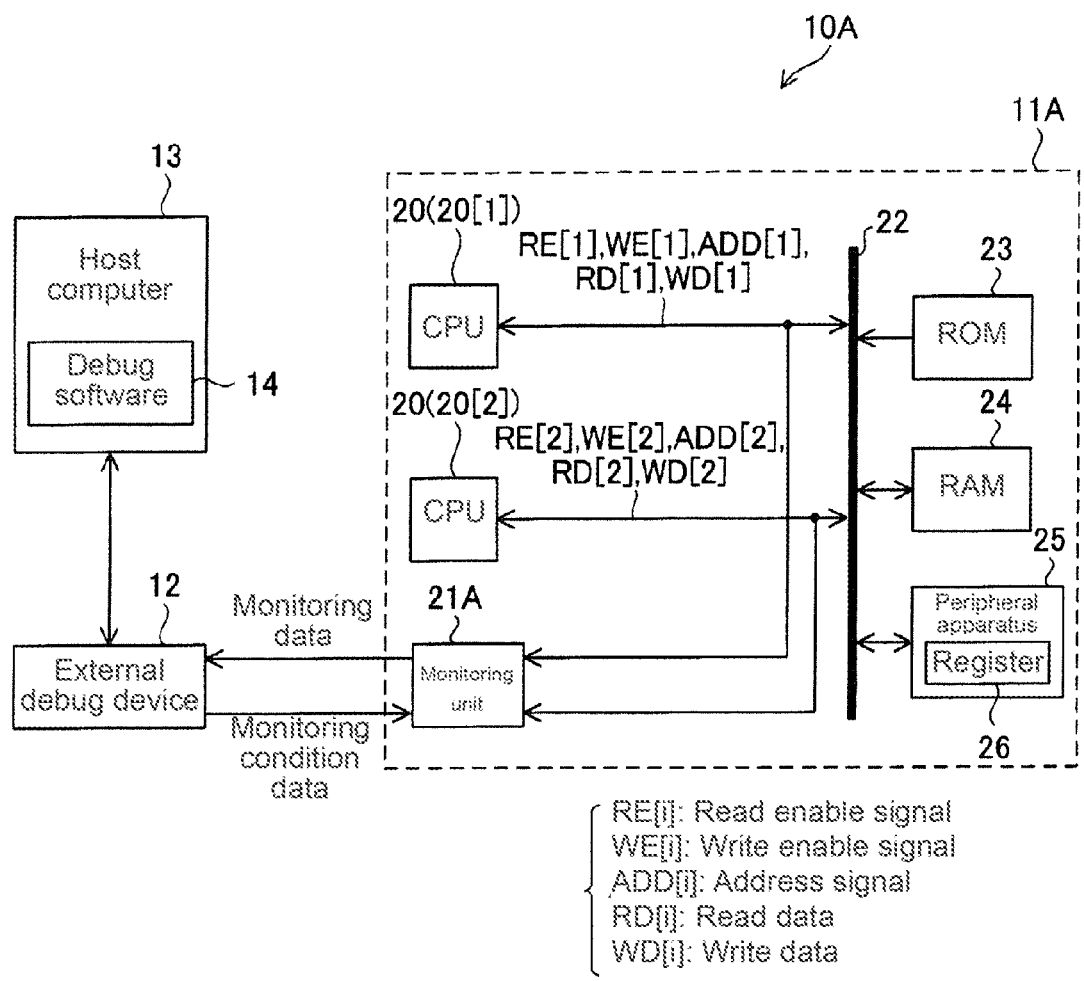
FIG. 5 is a brief structural diagram of a debug system according to a second embodiment of the present invention.

The second embodiment of the present invention is to be described below. FIG. 5 shows a brief structural diagram of a debug system 10A according to the second embodiment of the present invention. The debug system 10A includes an LSI 11A having a plurality of built-in CPUs, an external debug device 12 and a host computer 13 (a host PC 13).

The LSI 11A serving as a semiconductor device may include a plurality of CPUs 20, and further includes a monitoring unit 21A and an internal bus 22. Each of the CPUs 20 is connected to the internal bus 22. Any quantity of more than two CPUs 20 may be provided in the LSI 11A. Herein, the following description focuses on two CPUs 20 provided in the LSI 11A, and the two focused CPUs 20 are specifically referred to as a CPU 20[1] and a CPU 20[2]. In a form of being capable of receiving signals and data outputted from each of the CPUs 20 to the internal bus 22 as well as signals and data inputted from the internal bus 22 to each of the CPUs 20 by using the monitoring unit 21A, the monitoring unit 21A is connected to a wire between the CPU 20[1] and the internal bus 22, and is also connected to a wire between the CPU 20[2] and the internal bus 22.

The LSI 11A further includes more than one read only memory (ROM), more than one random access memory (RAM), and more than one peripheral apparatus serving as more than one peripheral circuit, as components connected to the internal bus 22. In FIG. 5, a ROM 23 serving as one ROM included in more than one ROM, a RAM 24 serving as one RAM included in more than one RAM, and a peripheral apparatus 25 serving as one peripheral apparatus included in more than one peripheral apparatus are depicted. Similar to the first embodiment, the following description associated with the second embodiment focuses on the ROM 23, the RAM 24 and the peripheral apparatus 25. A register 26 is built in the peripheral apparatus 25.

Each of the CPUs 20 executes a program stored in a program memory (not shown) configured in the LSI 11A. The program memory may also be built in each of the CPUs 20. Each of the CPUs 20 may access the internal bus 22 according to requirements while executing a program to read stored data in the ROM 23, the RAM 24 or the register 26, or write data to the RAM 24 or the register 26.

The functions and operations of the external debug device 12 and the host PC 13 in the second embodiment are identical to the functions and operations of the external debug device 12 and the host PC 13 in the first embodiment. That is, the external debug device 12 is connected to the monitoring unit 21A by a terminal (not shown) provided in the LSI 11, to serve as an interface that functions accordingly between the monitoring unit 21A and the host PC 13. The external debug device 12 and the host PC 13 are connected in a mode capable of bi-directional communication. Debug software 14 is executed in the host PC 13. A user of the debug system 10A may perform debug operations of programs executed by each of the CPUs 20 by operating the host PC 13 executing the debug software 14. Monitoring condition data may be sent from the external debug device 12 to the monitoring unit 21A, and the monitoring data may also be sent from the monitoring unit 21A to the external debug device 12.

Similar to the first embodiment, a storage circuit including the ROM 23, the RAM 24 and the register 26 is referred to as a storage unit (referring to FIG. 2). However, the storage unit 30 in the second embodiment refers to a storage unit provided in the LSI 11A. As previously described, the storage unit 30 has a plurality of storage areas capable of storing data of predetermined sizes. Predetermined address spaces are defined in the storage unit 30, and inherent addresses are allocated to the storage areas forming the storage unit 30.

Each of the CPUs 20 may perform a read access or a write access with respect to the internal bus 22 (in other words, with respect to the storage unit 30 through the internal bus 22). An access with respect to the RAM 24 or the register 26 may be any one of a read access and a write access. However, an access with respect to the ROM 23 is limited to being a read access. The storage unit 30 (e.g., the RAM 24) performs a read operation and a write operation, wherein the read operation is sending read data required through the internal bus 22 to the CPU 20[i] when a read access from the CPU 20[1] is accepted, and the write operation is storing data corresponding to write data sent from the CPU 20[i] through the internal bus 22 when a write access from the CPU 20[i] is accepted. Herein, i is 1 or 2.

Each of the CPUs 20 may output a read enable signal RE, a write enable signal WE, an address signal ADD and write data WD to the internal bus 22, and may accept an input of read data RD through the internal bus 22. The internal bus 22 includes a plurality of wires for individually sending the signals RE, WE and ADD as well as the data RD and WD between each of the CPUs 20 and the storage unit 30.

The meanings of these signals and data are, for example, as described as those in the first embodiment. That is, the read enable signal RE is configured as a one-bit signal set to a value "1" or "0"; the read enable signal RE in a value "1" serves as a signal for permitting a read operation, and the read enable signal RE in a value "0" serves as a signal for prohibiting a read operation. Further, the write enable signal WE is also configured as a one-bit signal set to a value "1" or "0"; the write enable signal WE in a value "1" serves as a signal for permitting a write operation, and the write enable signal WE in a value "0" serves as a signal for prohibiting a write operation. The address signal ADD is a signal designating the address of any one storage area in the storage unit 30, and has a bit count corresponding to the size of the address spaces defined in the storage unit 30. The read data RD is data obtained from reading the storage area from data stored in any one storage area in the storage unit 30. The write data WD is data that is to be written to any one storage area in the storage unit 30. The respective bit counts of the read data RD and the write data WD may be any bit count (e.g., 8 bits).

In the following description, sometimes the denotations RE[i], WE[i] and ADD[i] are specifically used to refer to the signals RE. WE and ADD outputted from the CPU 20[i] to the internal bus 22, and sometimes the denotations RD[i] and WD[i] are specifically used to refer to the read data RD inputted through the internal bus 22 to the CPU 20[i] and the write data WD outputted from the CPU 20[i] to the internal bus 22.

Figure 6A:
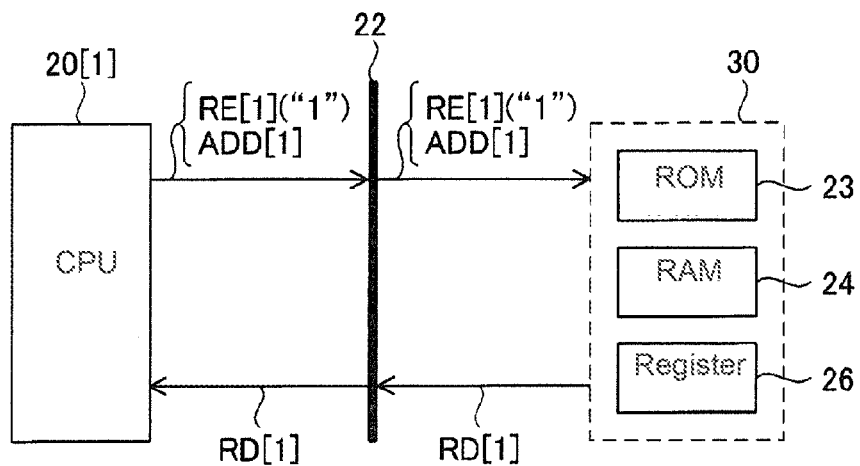
FIG. 6(a) is an illustration diagram of a read access and a read operation.

FIG. 6(a) shows a condition of a read access performed by the CPU 20[1]. The CPU 20[1] may perform a read access according to a program executed thereby. In the read access, the CPU 20[1] enables the storage unit 30 to perform a read operation by outputting the read enable signal RE[1] in "1" and the address signal ADD[1] designating any one of the plurality of addresses defined in the storage unit 30 to the internal bus 22. In a read operation in response to the read access from the CPU 20[1], the storage unit 30 (e.g., the RAM 24) reads stored data in a storage area of the address designated by the address signal ADD[1] inputted from the CPU 20[1] through the internal bus 22, and uses and outputs the read data as the read data RD[1] to the internal bus 22. The read data RD[1] outputted to the internal bus 22 by the read operation is inputted through the internal bus 22 to the CPU 20[1].

Figure 6B:
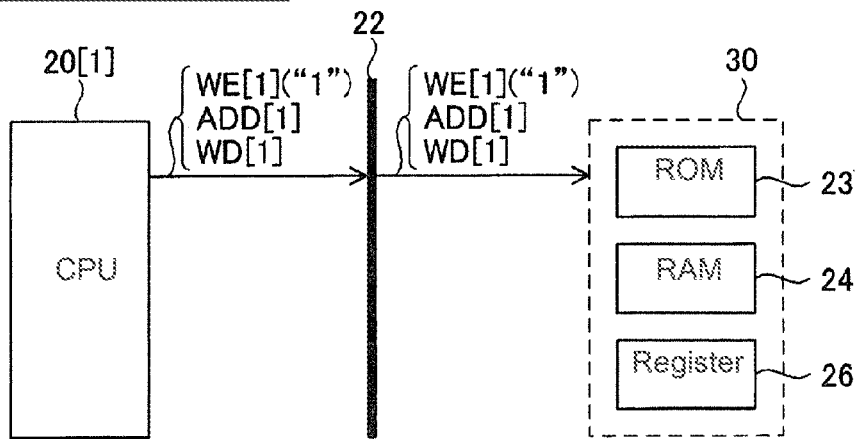
FIG. 6(b) is an illustration diagram of a write access and a write operation according to the second embodiment of the present invention.

FIG. 6(b) shows a condition of a write access performed by the CPU 20[1]. The CPU 20[1] may perform a write access according to a program executed thereby. In the write access, the CPU 20[1] enables the storage unit 30 to perform a write operation by outputting the write enable signal WE[1] in "1", the address signal ADD[1] designating any one of the plurality of addresses defined in the storage unit 30, and write data WD[1] to be written to the storage area of an address designated by the address signal ADD[1] to the internal bus 22. In a write operation in response to the write access from the CPU 20[1], the storage unit 30 (e.g., the RAM 24) stores data corresponding to the write data WD[1] from the CPU 20[1] to the storage area of the address designated by the address signal ADD[1] inputted from the CPU 20[1] through the internal bus 22. A condition where the stored data and the write data WD[1] of the corresponding storage area after the write operation are consistent may exist. However, a condition where data based on the write data WD[1] according to specifications is inconsistent with the write data WD[1] may also exist.

Figure 7A:
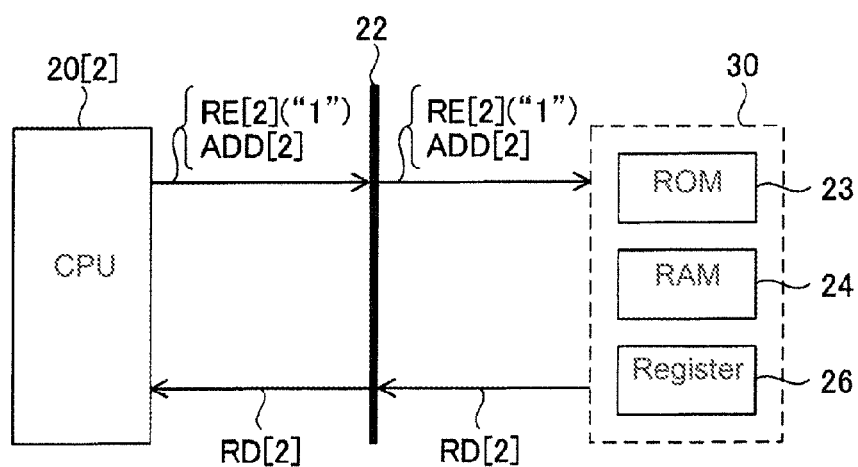
FIG. 7(a) is an illustration diagram of a read access and a read operation.

FIG. 7(a) shows a condition of a read access performed by the CPU 20[2]. The CPU 20[2] may perform a read access according to a program executed thereby. In the read access, the CPU 20[2] enables the storage unit 30 to perform a read operation by outputting the read enable signal RE[2] in "1"

and the address signal ADD[2] designating any one of the plurality of addresses defined in the storage unit 30 to the internal bus 22. In a read operation in response to the read access from the CPU 20[2], the storage unit 30 (e.g., the RAM 24) reads stored data in a storage area of the address designated by the address signal ADD[2] inputted from the CPU 20[2] through the internal bus 22, and uses and outputs the read data as the read data RD[2] to the internal bus 22. The read data RD[2] outputted to the internal bus 22 by the read operation is inputted through the internal bus 22 to the CPU 20[2].

Figure 7B:
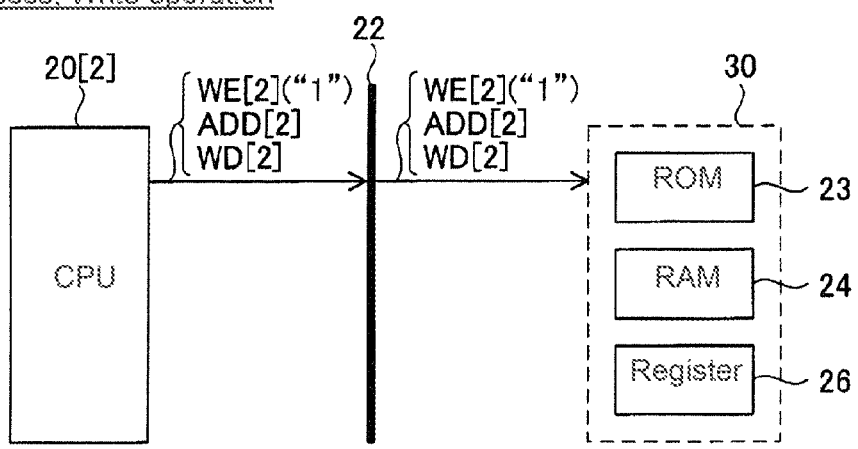
FIG. 7(b) is an illustration diagram of a write access and a write operation according to the second embodiment of the present invention.

FIG. 7(b) shows a condition of a write access performed by the CPU 20[2]. The CPU 20[2] may perform a write access according to a program executed thereby. In the write access, the CPU 20[2] enables the storage unit 30 to perform a write operation by outputting the write enable signal WE[2] in "1", the address signal ADD[2] designating any one of the plurality of addresses defined in the storage unit 30, and the write data WD[2] to be written to the storage area of the address designated by the address signal ADD[2] to the internal bus 22. In a write operation in response to the write access from the CPU 20[2], the storage unit 30 (e.g., the RAM 24) writes data corresponding to the write data WD[2] from the CPU 20[2] to the storage area of the address designated by the address signal ADD[2] inputted from the CPU 20[2] through the internal bus 22. A condition where the stored data and the write data WD[2] of the corresponding storage area after the write operation are consistent may exist. However, a condition where data based on the write data WD[2] according to specifications is inconsistent with the write data WD[2] may also exist.

Further, in order to avoid the CPUs 20[1] and 20[2] from simultaneously accessing (by a read access or a write access) the internal bus 22, a mediation circuit (not shown) adjusting access timing of the CPUs 20[1] and 20[2] may also be provided in the LSI 11A.

In the debug operation of the program executed by each of the CPUs 20, a requirement of monitoring and tracking data read by each of the CPUs 20 from a specific address or data written to a specific address by each of the CPUs 20 needs to be satisfied. The monitoring unit 21A uses the configuration identical to that in the first embodiment to respond to such requirement. However, a configuration of a plurality of CPUs serving as bus main controllers and functioning accordingly needs to be taken into consideration.

Figure 8:
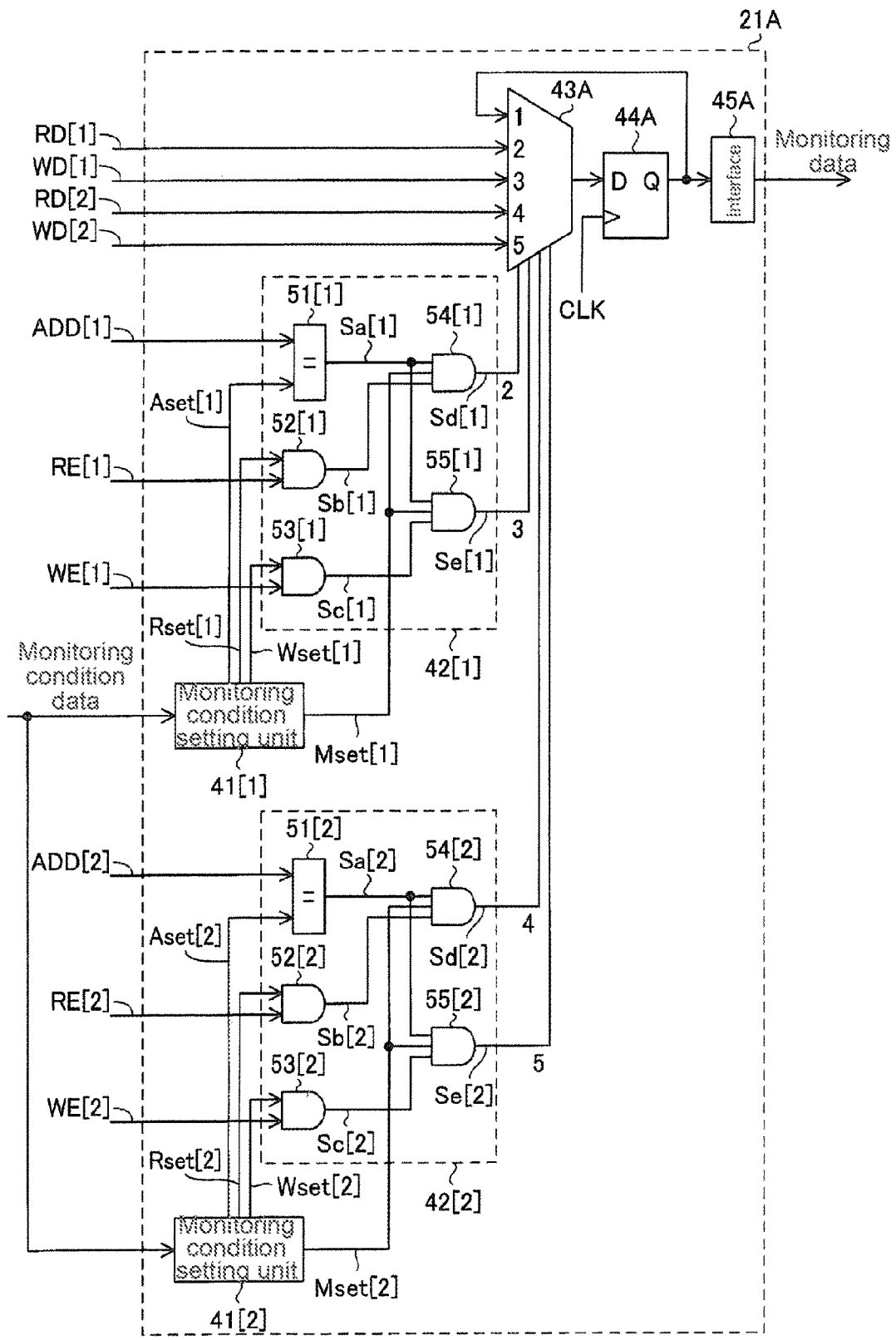
FIG. 8 is an internal structural diagram of a monitoring unit according to the second embodiment of the present invention.

FIG. 8 shows an internal structure of the monitoring unit 21A. The monitoring unit 21A in FIG. 8 includes a monitoring condition setting unit 41[1] and a monitoring condition setting unit 42[1] with respect to the CPU 20[1], a monitoring condition setting unit 41[2] and a monitoring condition determination unit 42[2] with respect to the CPU 20[2], a selector 43A, a latch unit 44A and an interface 45A.

A user of the debug system 10A may designate a monitoring condition as desired by operating the host PC 13 before the debug operation of each of the CPUs 20 is performed. In the second embodiment, the monitoring condition is a monitoring condition with respect to a CPU block (a processing block) including a plurality of CPUs 20 (to be referred to as a CPU 20[1] and a CPU 20[2]), and may be considered to be further divided into a monitoring condition with respect to the CPU 20[1] and a monitoring condition with respect to the CPU 20[2]. In the monitoring condition, apart from the target address and the target access type set for each of the CPUs 20, data obtained by which of the CPUs 20 is further set as a monitored target. The data set as the monitored target is latched by the latch unit 44A, and so the monitored target may also be referred to as a latch target. The monitoring condition designated by operating the host PC 13 serves as the monitoring condition data and is provided from the external debug device 12 to the monitoring unit 21A.

In the monitoring condition setting unit 41[1], the monitoring condition with respect to the CPU 20[1] is set according to the monitoring condition data provided from the external debug device 12. The monitoring condition with respect to the CPU 20[1] includes the target address and the target access type with respect to the CPU 20[1], and further determines whether to set the data obtained by the access of the CPU 20[1] as a monitored target.

The monitoring condition setting unit 41[1] outputs, according to the monitoring condition data, an address setting signal Aset[1] representing the target address with respect to the CPU 20[1], a read setting signal Rset[1] and a write setting signal Wset[1] corresponding to the target access type with respect to the CPU 20[1], and a monitoring required/non-required setting signal Mset[1] determining whether to set the data obtained by the access of the CPU 20[1] as the monitored target. The read setting signal Rset[1] and the write setting signal Wset[1] are respective one-bit signals having a value "1" or "0". The value of the read setting signal Rset[1] becomes "1" if the target access type with respect to the CPU 20[1] includes a read access, or else the read setting signal Rset[1] becomes "0" if the target access type with respect to the CPU 20[1] does not include a read access. The value of the write setting signal Wset[1] becomes "1" if the target access type with respect to the CPU 20[1] includes a write access, or else the write setting signal Wset[1] becomes "0" if the target access type with respect to the CPU 20[1] does not include a write access. The value of the monitoring required/non-required setting signal Mset[1] becomes "1" if the data obtained by the access of the CPU 20[1] is set as the monitored target, or else value of the monitoring required/non-required setting signal Mset[1] becomes "0" in a condition that is not so.

Details of the monitoring condition setting unit 41[2] are identical to those of the monitoring condition setting unit 41[1]. That is, in the monitoring condition setting unit 41[2], the monitoring condition with respect to the CPU 20[2] is set according to the monitoring condition data provided from the external debug device 12. The monitoring condition with respect to the CPU 20[2] includes the target address and the target access type with respect to the CPU 20[2], and further determines whether to set the data obtained by the access of the CPU 20[2] as a monitored target.

The monitoring condition setting unit 41[2] outputs, according to the monitoring condition data, an address setting signal Aset[2] representing the target address with respect to the CPU 20[2], a read setting signal Rset[2] and a write setting signal Wset[2] with respect to the CPU 20[2], and a monitoring required/non-required setting signal Mset[2] determining whether to set the data obtained by the access of the CPU 20[2] as the monitored target. The read setting signal Rset[2] and the write setting signal Wset[2] are respective one-bit signals having a value "1" or "0". The value of the read setting signal Rset[2] becomes "1" if the target access type with respect to the CPU 20[2] includes a read access, or else the read setting signal Rset[2] becomes "0" if the target access type with respect to the CPU 20[2] does not include a read access. The value of the write setting signal Wset[2] becomes "1" if the target access type with respect to the CPU 20[2] includes a write access, or else the write setting signal Wset[2] becomes "0" if the target access type with respect to the CPU 20[2] does not include a write access. The value of the monitoring required/non-required setting signal Mset[2] becomes "1" if the data obtained by the access of the CPU 20[2] is set as the monitored target, or else value of the monitoring required/non-required setting signal Mset[2] becomes "0" in a condition that is not so.

The monitoring condition determination units 42[1] and 42[2] determine whether accesses performed by a CPU block (a processing block) having a plurality of CPUs 20 (referred to as CPU 20[1] and 20[2]) match monitoring conditions set by the setting units 41[1] and 41[2].

With respect to the monitoring condition determination unit 42[1], the signals ADD[1], RE[1] and WE[1] outputted by the CPU 20[1] to the internal bus 22 are inputted, and the signals Aset[1], Rset[1], Wset[1] and Mset[1] from the setting unit 41[1] are inputted. The monitoring condition determination unit 42[1] determines according to the input signals thereto whether the CPU 20[1] has performed an access matching the monitoring condition.

Similarly, with respect to the monitoring condition determination unit 42[2], the signals ADD[2], RE[2] and WE[2] outputted by the CPU 20[2] to the internal bus 22 are inputted, and the signals Aset[2], Rset[2], Wset[2] and Mset[2] from the setting unit 41[2] are inputted. The monitoring condition determination unit 42[2] determines according to the input signals thereto whether the CPU 20[2] has performed an access matching the monitoring condition.

The internal structures and operations of the monitoring condition determination units 42[1] and 42[2] are mutually identical. Using a variant i having an integer value "1" or "2", the internal structure and operation of the monitoring condition determination unit 42[i] are described below.

The monitoring condition determination unit 42[i] includes an address determination circuit 51[i] and AND gate circuits 52[i], 53[i], 54[i] and 55[i]. The address determination circuit 51[i] receives the address signal ADD[i] inputted from the CPU 20[i] to the internal bus 22 and the address setting signal Aset[i] from the setting unit 41[i], and outputs a signal Sa[i] in a value "1" if the address represented by the address signal ADD[i] and the target address represented by the address setting signal Aset[i] are consistent, or else outputs the signal Sa[i] in a value "0" if these addresses are inconsistent.

The AND gate circuit 52[i] outputs a signal Sb[i], which represents the logical AND of the read enable signal RE[i] outputted from the CPU20[i] to the internal bus 22 and the read setting signal Rset[i] from the setting unit 41[i]. The signal Sb[i] has a value "1" only if both of the values of the signals RE[i] and Rset[i] are "1", and else has a value "0". The AND gate circuit 53[i] outputs a signal Sc[i], which represents the logical AND of the write enable signal WE[i] outputted from the CPU 20[i] to the internal bus 22 and the write setting signal Wset[i] from the setting unit 41[i]. The signal Sc[i] has a value "1" only if both of the values of the signals WE[i] and Wset[i] are "1", and else has a value "0".

The AND gate circuit 54[i] outputs a signal Sd[i] representing the logical AND of the signals Sa[i], Sb[i] and Mset[i]. The signal Sd[i] has a value "1" only if all of the values of the signals Sa[i], Sb[i] and Mset[i] are "1", and else has a value "0". The AND gate 55[i] outputs a signal Se[i] representing the logical AND of the signals Sa[i], Sc[i] and Mset[i]. The signal Se[i] has a value "1" only if all of the values of the signals Sa[i], Sc[i] and Mset[i] are "1", and else has a value "0". Because a read access and a write access are not simultaneously performed, the signals Sd[i] and Se[i] do not simultaneously have a value "1".

Thus, in the monitoring condition, the target address and the target access type are set with respect to each of the CPUs 20, and the data obtained by the access of which of the CPUs 20 is set as a monitored target (i.e., setting as a latch target of the latch unit 44A). To keep the illustration simple, in the monitoring condition, a condition where the data obtained by the access of the CPU20[i] is set as the monitored target (i.e., setting as the latch target of the latch unit 44A), that is, a condition where the value of the signal Mset[i] is "1", is referred to as a state ST[i]. As such, in the state ST[i], if the address designated by the address signal ADD[i] in the access (a read access or a write access) of the CPU 20[i] and the target address (corresponding to Aset[i]) set with respect to the CPU 20[i] are consistent, and the CPU 20[i] performs an access suitable for the target access type (corresponding to Rset[i] or Wset[i]) set with respect to the CPU20[i], the monitoring condition determination unit 42[i] determines that the access performed by the CPU 20[i] is suitable for the monitoring condition, and sets the value of the signal Sd[i] or Se[i] to "1". The signal Sd[i] in a value "1" indicates that the access suitable for the target access type is a read access, and the signal Se[i] in a value "1" indicates a write access.

If the CPU 20[i] performs an access matching the monitoring condition, the selector 43A outputs the read data RD[i] or write data WD[i] to be sent through the internal bus 22 to the latch unit 44A. The latch unit 44A has an input terminal D and an output terminal Q. Output data of the selector 43A is inputted to the input terminal D of the latch unit 44A. The latch unit 44A latches (i.e., stores) the data that are synchronously applied to the input terminal D with an operation clock CLK of each of the CPUs 20 and outputs the latched data from the output terminal Q. Thus, when the CPU 20[i] performs an access matching the monitoring condition, the read data RD[i] or the write data WD[i] (in other words, the read data RD[i] or the write data WD[i] obtained by an access matching the monitoring condition) to be sent through the internal bus 22 is latched by the latch unit 44A. Further, it is assumed herein that the operation clocks CLK of the CPU 20[1] and CPU 20[2] are common.

More specifically, the selector 43A has first to fifth input terminals and an output terminal. The output data from the output terminal Q of the latch unit 44A is inputted to the first terminal, the second input terminal is connected to the wire for sending the read data RD[1] (the read data RD[1] appears in the wire when the CPU 20[1] performs a read access), the third input terminal is connected to the wire for sending the write data WD[1] (the write data WD[1] appears in the wire when the CPU 20[1] performs a write access), the fourth input terminal is connected to the wire for sending the read data RD[2] (the read data RD[2] appears in the wire when the CPU 20[2] performs a read access), and the fifth input terminal is connected to the wire for sending the write data WD[2] (the write data WD[2] appears in the wire when the CPU 20[2] performs a write access).

Further, the selector 43A selects and outputs the data to be applied to the first input terminal if the all of the values of the signals Sd[1], Se[1], Sd[2] and Se[2] are "0", and respectively selects and outputs the data to be applied to the second, third, fourth and fifth input terminals if the values of the signals Sd[1], Se[1], Sd[2] and Se[2] are "1". Further, because a plurality of accesses are not simultaneously performed on the internal bus 22, the values of two or more signals among the signals Sd[1], Se[1], Sd[2] and Se[2] do not simultaneously become "1".

Therefore, in the state ST[i], if the target access type set with respect to the CPU 20[i] includes a read access, if the CPU 20[i] performs a read access on the target address set with respect to the CPU 20[i], the read data RD[i] identical to the read data RD[i] inputted through the internal bus 22 to the CPU 20[i] is inputted through the selector 43A and latched in the latch unit 44A.

Similarly, in the state ST[i], if the target access type set with respect to the CPU 20[i] includes a write access, if the CPU 20[i] performs a write access on the target address set with respect to the CPU 20[i], the write data WD[i] identical to the write data WD[i] outputted by the CPU 20[i] to the internal bus 22 is inputted through the selector 43A and latched in the latch unit 44A.

If an access matching the monitoring condition is not performed, the output data of the latch unit 44A is inputted through the first input terminal of the selector 43A to the input terminal D of the latch unit 44A, and thus no change occurs in the data latched in the latch unit 44A.

The output data of the latch unit 44A is provided to the interface 45A. The interface 45A is a circuit that sends the output data of the latch unit 44A as monitoring data to the external debug device 12. The interface 45A and the external debug device 12 operate according to a clock asynchronous with the operation clock CLK of the CPUs 20. The debug software 14 may, for example, periodically read the data latched in the latch unit 44A as the monitoring data (controlling the external debug device 12 by such means) so as to fetch the data to be monitored.

As a specific example, an embodiment $CS_R[i]$ is assumed. In the embodiment $CS_R[i]$, it is expected to monitor data read by the CPU 20[i] from the storage area allocated with an address numbered 5000 in the address space, and a user performs an operation on the host PC 13 according to the expectation. Thus, the data obtained by the access of the CPU 20[i] is set as the monitored target, the target address with respect to the CPU 20[i] is set with the numeral 5000, and a read access is set with respect to the target access type. As a result, the address setting signal Aset[i] representing the address numbered 5000, the read setting signal Rset[i] in "1", and the monitoring required/non-required setting signal Mset[i] in "1" are outputted from the setting unit 41[i] to the determination unit 42[i].

In the embodiment $CS_R[i]$, when the CPU 20[i] actually performs a read access on the storage area of the address numbered 5000, the address signal ADD[i] representing the address numbered 5000 and the read enable signal RE[i] in "1" are outputted from the CPU 20[i] to the internal bus 22, and hence the monitoring condition with respect to the read access is met, and the value of the signal Sd[i] becomes "1". As a result, the read data RD[i] identical to the read data RD[i] acquired by the CPU 20[i] through the internal bus 22 is inputted through the selector 43A and latched in the latch unit 44A.

For another example, an embodiment $CS_W[i]$ is assumed. In the embodiment $CS_W[i]$, it is expected to monitor data written by the CPU 20[i] to the storage area allocated with an address numbered 5000 in the address spaces, and a user performs an operation on the host PC 13 according to the expectation. Thus, the data obtained by the access of the CPU 20[i] is set as the monitored target, the target address with respect to the CPU 20[i] is set with the numeral 5000, and a write access is set with respect to the target access type. As a result, the address setting signal Aset[i] representing the numeral 5000, the write setting signal Wset[i] in "1" and the monitoring required/non-required setting signal Mset[i] in "1" are outputted from the setting unit 41[i] to the determination unit 42[i].

In the embodiment $CS_W[i]$, when the CPU 20[i] actually performs a write access with respect to the storage area of the address numbered 5000, the address signal ADD[i] representing the address numbered 5000 and the write enable signal WE[i] in "1" are outputted from the CPU 20[i] to the internal bus 22, and hence the monitoring condition with respect to the write access is met, and the value of the signal Se[i] becomes "1". As a result, the write data WD[i] identical to the write data WD[i] outputted by the CPU 20[i] to the internal bus 22 is inputted through the selector 4A3 and latched in the latch unit 44A.

In the embodiment $CS_R[i]$ or the embodiment $CS_W[i]$, the target access type may include both of the read access and the write access as desired. However, if the target access type includes both of the read access and the write access, the operations of the embodiment $CS_R[i]$ and the operations of the embodiment $CS_W[i]$ are both implemented by the monitoring unit 21A.

Further, the user may set only any one of the data obtained by the access of the CPU 20[1] and the data obtained by the access of the CPU 20[2] as the monitored target, or the both of the two may be set as the monitored target. If both are set as the monitored target, the signals Mset[1] and Mset[2] both have a value "1".

According to this embodiment, in the debug operation, the data read from the storage unit 30 or data written to the storage unit 30 by each of the CPUs 20 may be accurately monitored and tracked. In the implementation, a DMA controller or a tracking memory is not needed (and thus, a circuit additionally provided may be in a small scale), and it is equivalent to monitoring from the side the input/output signals/data of each of the CPU 20s accompanied by the accesses of each of the CPUs 20 without generating any influences on the behaviors of each of the CPUs 20.

A plurality of monitoring units 21A may also be provided in the LSI 11A. Accordingly, read data RD[i] or write data WD[i] with respect to a plurality of addresses may be monitored. Further, in this case, some of the structures (e.g., the interface 45A) may be shared among the plurality of monitoring units 21A.

Third Embodiment

The third embodiment of the present invention is to be described below. In the third embodiment, some practiced technologies and variation technologies applied in the first and second embodiments are described below. The third embodiment includes the embodiments EX3_1 to EX3_5 below.

Embodiment EX3_1

Figure 9:
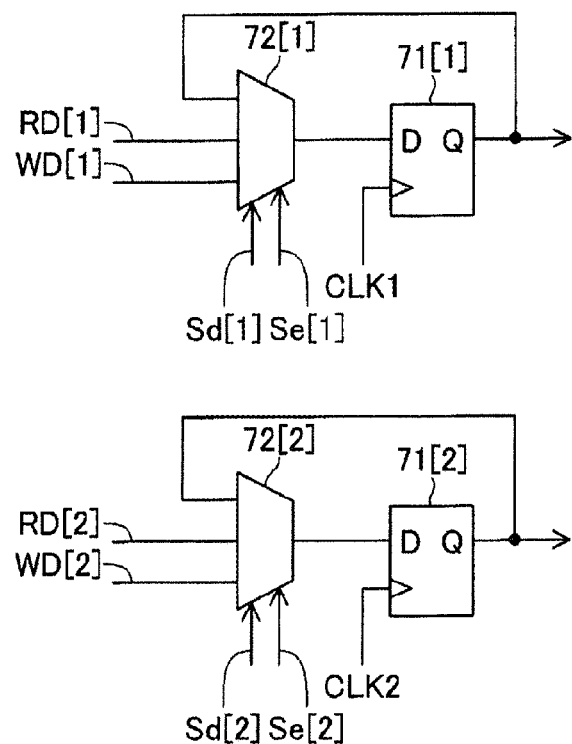
FIG. 9 is a partial structural diagram of a monitoring unit according to a third embodiment of the present invention.

Embodiment EX3_1 is to be described below. In the second embodiment, it is assumed that the operation clocks of the CPU 20[1] and CPU 20[2] are common. However, the operation clocks of the CPU 20[1] and CPU 20[2] may also be different from each other. However, in this case, latch circuits 71[1] and 71[2] in FIG. 9 as substitution for the latch unit 44A in FIG. 8 may be configured in advance in the monitoring unit 21A, and selectors 72[1] and 72[2] in FIG. 9 as substitution for the selector 43A in FIG. 8 may be configured in advance in the monitoring unit 21A. Accordingly, when the CPU 20[i] performs an access matching the monitoring condition, the read data RD[i] or the write data WD[i] to be sent through the internal bus 22 may be latched by the latch circuit 71[i].

More specifically, each of the latch circuits 71[1] and 71[2] has an input terminal D and an output terminal Q. Output data of the selector 72[1] is inputted to the input terminal D of the latch circuit 71[1], and output data of the selector 72[2] is inputted to the input terminal D of the latch circuit 71[2]. The latch circuit 71[1] latches (i.e., stores) the data that are synchronously applied to the input terminal D thereof with an operation clock CLK1 of the CPU 20[1], and outputs the latched data from the output terminal Q thereof. The latch circuit 71[2] latches (i.e., stores) the data that are synchronously applied to the input terminal D thereof with an operation clock CLK2 of the CPU 20[2], and outputs the latched data from the output terminal Q thereof.

The selector 72[1] has first to third input terminals and an output terminal. In the selector 72[1], the output data from the output terminal Q of the latch unit 71[1] is inputted to the first terminal, the second input terminal is connected to the wire for sending the read data RD[1] (the read data RD[1] appears in the wire when the CPU 20[1] performs a read access), and the third input terminal is connected to the wire for sending the write data WD[1] (the write data WD[1] appears in the wire when the CPU 20[1] performs a write access). Further, the selector 72[1] selects and outputs the data to be applied to the first input terminal if the both of the values of the signals Sd[1] and Se[1] are "0", and respectively selects and outputs the data to be applied to the second and third input terminals if the values of the signals Sd[1] and Se[1] are "1".

The selector 72[2] has first to third input terminals and an output terminal. In the selector 72[2], the output data from the output terminal Q of the latch unit 71[2] is inputted to the first terminal, the second input terminal is connected to the wire for sending the read data RD[2] (the read data RD[2] appears in the wire when the CPU 20[2] performs a read access), and the third input terminal is connected to the wire for sending the write data WD[2] (the write data WD[2] appears in the wire when the CPU 20[2] performs a write access). Further, the selector 72[2] selects and outputs the data to be applied to the first input terminal if the both of the values of the signals Sd[2] and Se[2] are "0", and respectively selects and outputs the data to be applied to the second and third input terminals if the values of the signals Sd[2] and Se[2] are "1".

Embodiment EX3_2

Figure 10:
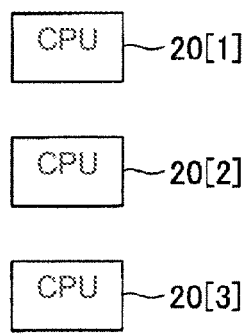
FIG. 10 is a diagram of three CPUs that can be provided in an LSI according to the third embodiment of the present invention.
Figure 11:
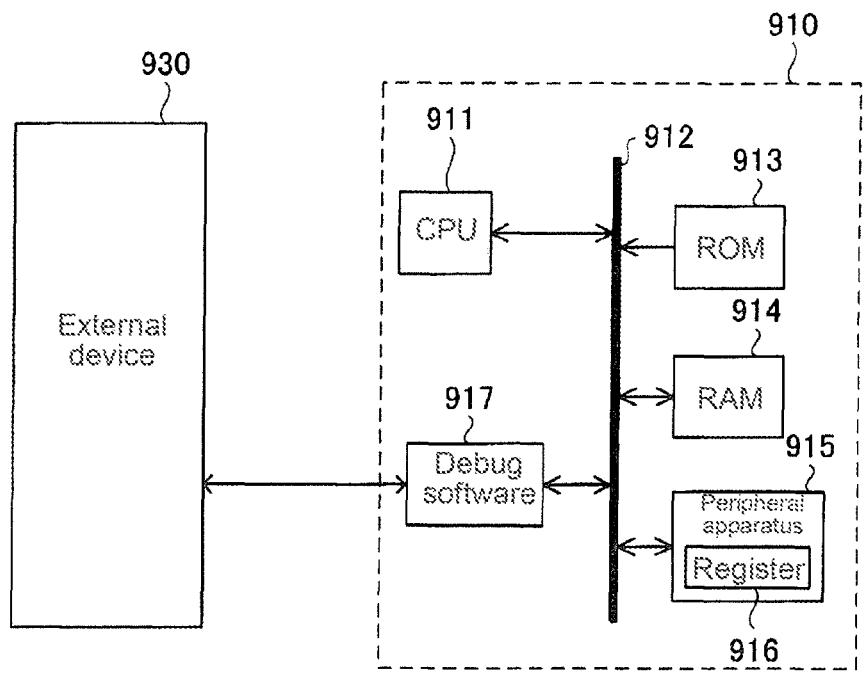
FIG. 11 is a brief structural diagram of a debug system of related art of the present invention.
Figure 12:
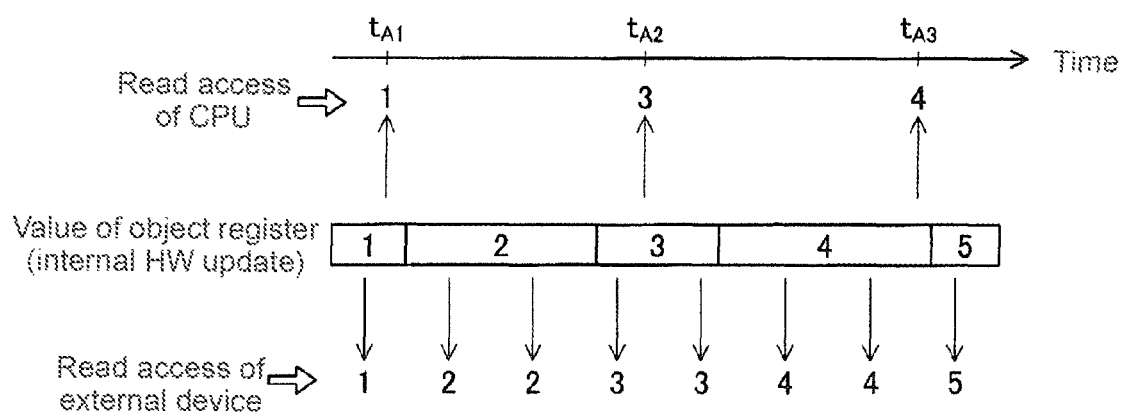
FIG. 12 is an illustration diagram of an operation example of the debug system in FIG. 11.
Figure 13:
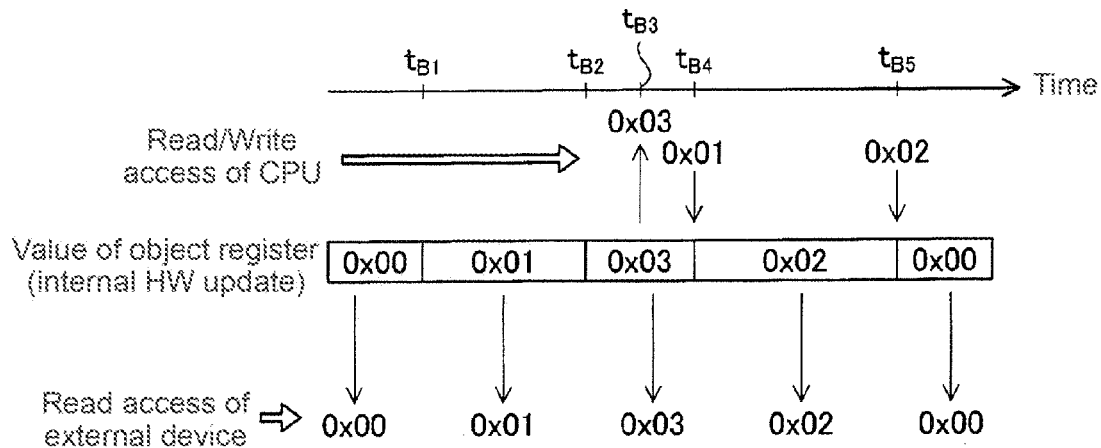
FIG. 13 is an illustration diagram of another operation example of the debug system in FIG. 11.
Figure 14:
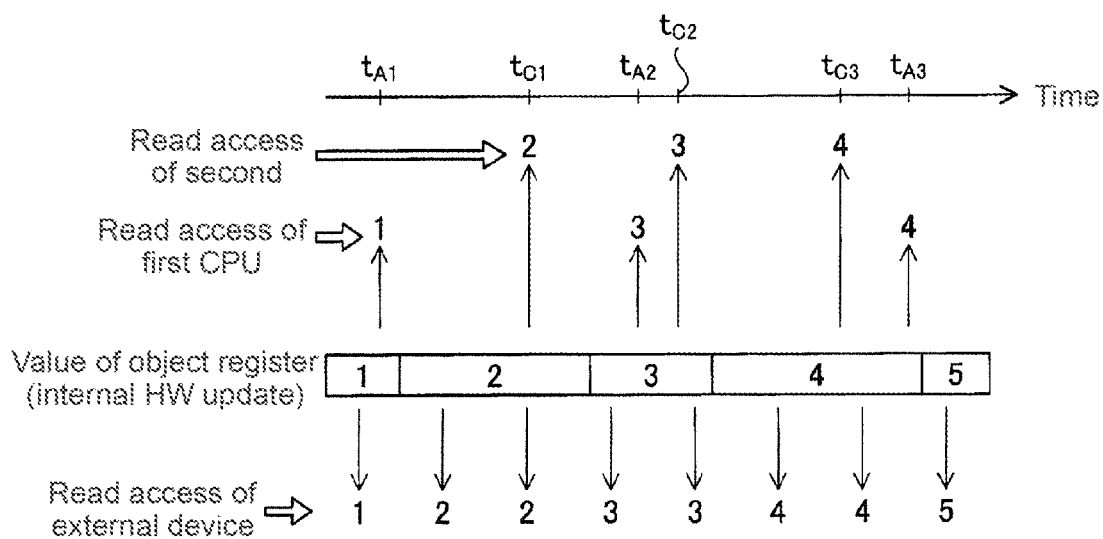
FIG. 14 is an illustration diagram of yet another operation example of the debug system in FIG. 11.

Embodiment EX3_2 is to be described below. In the second embodiment, it is assumed that the quantity of the CPUs 20 is two. However, in the second embodiment, the quantity of the CPUs 20 provided in the LSI 11A and performing an access on the internal bus 22 may also be three or more. If three CPUs including a CPU 20[1], a CPU 20[2] and a CPU 20[3] serve as the CPUs 20 (referring to FIG. 10), a monitoring condition setting unit 41[3] and a monitoring condition determination unit 42[3] (neither shown) having the same structures as the monitoring condition setting unit 41[1] and the monitoring condition determination unit 42[1] are additionally provided in the monitoring unit 21A, and the setting unit 41[3] and the determination unit 42[3] are used to perform setting of the monitoring condition with respect to the CPU 20[3] and to determine whether the monitoring condition is satisfied or not satisfied. The same applies to a condition where the quantity of the CPUs 20 is four or more.

Embodiment EX3_3

Embodiment EX3_3 is to be described below. In the first or second embodiment, the CPU 20 accessing the internal bus 22 is given as an example of a processing unit. However, in the present invention, such processing unit is not limited to being a CPU, and any unit performing accesses on the internal bus 22 may become the processing unit.

Embodiment EX3_4

Embodiment EX3_4 is to be described below. The circuit elements forming the LSI 11 are formed by means of a semiconductor integrated circuit, and the semiconductor integrated circuit is packaged in a housing (a package) having resin to form a semiconductor device. The same applies to the LSI 11A. However, a plurality of discrete components may also be used to form circuits identical to the circuits in the LSI 11. The same applies to LSI 11A.

Embodiment EX3_5

Embodiment EX3_5 is to be described below. The debug system of the present invention includes the semiconductor device exemplified by the LSI (11 or 11A), and an external device connected to the semiconductor device. In the structure in FIG. 1 or FIG. 5, the external device may be understood as the external debug device 12, or may be understood as including both of the external debug device 12 and the host PC 13.

Various modifications within the scope of the technical concept disclosed by the claims may be appropriately made to the embodiments of the present invention. The embodiments are examples of embodiments of the present invention, and the terms and meanings of the components or the present invention are not limited to the contents described in the embodiments. The specific values recited in the description above are merely examples, and these values may be modified to various other values.

What is claimed is:

1. A semiconductor device, comprising:
    memory storing a program;
    a processing unit coupled to the memory and operable to execute the program;
    a storage unit, having a plurality of storage areas allocated with a plurality of addresses and operable to perform a read operation or a write operation; and
    a bus coupled to the processing unit and the storage unit;
    wherein:
    the processing unit is operable to perform a read access or a write access according to the program, wherein the read access enables the storage unit to perform the read operation by outputting a read enable signal and an address signal to the bus, wherein the read enable signal permits the read operation and the address signal designates any one of the plurality of addresses, wherein the write access enables the storage unit to perform the write operation by outputting a write data, a write enable signal and the address signal to the bus, wherein the write enable signal permits the write operation;
    the semiconductor device is configured such that:
        when the read access is performed, the storage unit performs the read operation, that is, outputting a data in the storage area as a read data to the bus, wherein the data in the storage area is corresponding to the address signal inputted from the processing unit through the bus, and the read data is inputted through the bus to the processing unit; and
        when the write access is performed, the storage unit performs the write operation, that is, storing data corresponding to the write data in the storage area, wherein the storage area is corresponding to the address signal inputted from the processing unit through the bus; and the semiconductor device further comprising a monitoring unit operable to latch the read data or the write data sent through the bus when access is matching a set monitoring condition in access performed by the processing unit, wherein the monitoring unit comprises a determination unit operable to determine whether access performed by the processing unit is matching the monitoring condition, wherein in the monitoring condition, a target address and a target access type are set; and the determination unit is operable to determine that access performed by the processing unit is matching the monitoring condition when the address designated by access performed by the processing unit and the target address are matched, wherein the processing unit is operable to perform access suitable for the target access type.

2. The semiconductor device according to claim 1, wherein the monitoring unit further comprises: a setting unit operable to set the monitoring condition; and a latch unit, latching the read data or the write data if access performed by the processing unit is matching the monitoring condition.

3. The semiconductor device according to claim 1, wherein the semiconductor device is operable such that:

if the target access type includes the read access, the read data is latched by the latch unit when the processing unit performs the read access on the target address.

4. The semiconductor device according to claim 3, wherein the semiconductor device is operable such that:

if the target access type includes the write access, the write data is latched by the latch unit when the processing unit performs the write access on the target address.

5. The semiconductor device according to claim 1, wherein the semiconductor device is operable such that:

if the target access type includes the write access, the write data is latched by the latch unit when the processing unit performs the write access on the target address.

6. A debug system, comprising:

the semiconductor device according to claim 1; and an external device coupled to the semiconductor device;

wherein the debug system is configured to send a monitoring condition data designating the monitoring condition from the external device to the semiconductor device, and to send data latched in the monitoring unit from the semiconductor device to the external device.

7. A semiconductor device, comprising:

memory storing a program;

a processing block coupled to the memory, the processing block having first to $n_{th}$ processing units (where n is an integer more than 2) operable to execute the program respectively;

a storage unit, having a plurality of storage areas allocated with a plurality of addresses and operable to perform a read operation or a write operation; and a bus, connected to each of the processing units and the storage unit;

wherein:

each of the processing units is operable to perform a read access or a write access according to the corresponding program, wherein the read access enables the storage unit to perform the read operation by outputting a read enable signal and an address signal to the bus, wherein the read enable signal permits the read operation and the address signal designates any one of the plurality of addresses, wherein the write access enables the storage unit to perform the write operation by outputting a write data, a write enable signal and the address signal to the bus, wherein the write enable signal permits the write operation;

the semiconductor device is configured such that:

when the $i_{th}$ processing unit performs the read access, the storage unit performs the read operation, that is, outputting a data in the storage area as a read data to the bus, wherein the data in the storage area is corresponding to the address signal inputted from the $i_{th}$ processing unit through the bus, and the read data is inputted through the bus to the $i_{th}$ processing unit (where i is an integer more than 1 and less than n); and when the $i_{th}$ processing unit performs the write access, the storage unit performs the write operation, that is, storing data corresponding to the write data from the $i_{th}$ processing unit in the storage area, wherein the storage area is corresponding to the address signal inputted from the $i_{th}$ processing unit through the bus; and the semiconductor device further comprising a monitoring unit operable to latch the read data or the write data sent through the bus when access is matching a set monitoring condition in access performed by the processing block, wherein the monitoring unit comprises a determination unit operable to determine whether the access performed by the processing block is matching the monitoring condition, wherein in the monitoring condition, a target address and a target access type are set for each of the processing units, and a data obtained from access performed by either one of the processing units are set as a target for the latching, and the semiconductor device is configured such that if the data obtained from access performed by the $i_{th}$ processing unit are set as the target for latching in the monitoring condition, the determination unit determines that access performed by the processing block is matching the monitoring condition when the address designated by access performed by the $i_{th}$ processing unit and the target address set with respect to the $i_{th}$ processing unit are matched, and the $i_{th}$ processing unit performs access suitable for the target access type set with respect to the $i_{th}$ processing unit.

8. The semiconductor device according to claim 7, wherein the monitoring unit further comprises: a setting unit operable to set the monitoring condition; and a latch unit operable to latch the read data or the write data if access performed by the processing block is matching the monitoring condition.

9. The semiconductor device according to claim 7, wherein the semiconductor device is configured such that if the target access type set with respect to the $i_{th}$ processing unit includes the read access, the read data inputted to the $i_{th}$ processing unit is latched by the latch unit when the $i_{th}$ processing unit performs the read access on the target address set with respect to the $i_{th}$ processing unit.

10. The semiconductor device according to claim 9, wherein
the semiconductor device is configured such that if the target access type set with respect to the $i_{th}$ processing unit includes the write access, the write data outputted from the $i_{th}$ processing unit is latched by the latch unit when the $i_{th}$ processing unit performs the write access on the target address set with respect to the $i_{th}$ processing unit.

11. The semiconductor device according to claim 7, wherein
the semiconductor device is configured such that if the target access type set with respect to the $i_{th}$ processing unit includes the write access, the write data outputted from the $i_{th}$ processing unit is latched by the latch unit when the $i_{th}$ processing unit performs the write access on the target address set with respect to the $i_{th}$ processing unit.

* * * * *